United States Patent
Yamashita et al.

(10) Patent No.: US 10,066,532 B2
(45) Date of Patent: Sep. 4, 2018

(54) ELECTRIC SUPERCHARGING DEVICE UTILIZING WASTE HEAT OF INTERNAL COMBUSTION ENGINE AND POWER SUPPLYING METHOD THEREOF

(71) Applicant: MITSUBISHI HEAVY INDUSTRIES, LTD., Tokyo (JP)

(72) Inventors: Yukio Yamashita, Tokyo (JP); Byeongil An, Tokyo (JP); Motoki Ebisu, Tokyo (JP); Musashi Sakamoto, Tokyo (JP); Hiroshi Ogita, Sagamihara (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 722 days.

(21) Appl. No.: 14/367,952

(22) PCT Filed: Oct. 29, 2012

(86) PCT No.: PCT/JP2012/077879
§ 371 (c)(1),
(2) Date: Jun. 23, 2014

(87) PCT Pub. No.: WO2013/099420
PCT Pub. Date: Jul. 4, 2013

(65) Prior Publication Data
US 2015/0285122 A1    Oct. 8, 2015

(30) Foreign Application Priority Data

Dec. 27, 2011 (JP) .................................. 2011-285466

(51) Int. Cl.
*F01N 5/02* (2006.01)
*F02C 6/18* (2006.01)
(Continued)

(52) U.S. Cl.
CPC ................ *F01N 5/02* (2013.01); *F01K 13/02* (2013.01); *F01K 23/065* (2013.01); *F01K 23/10* (2013.01);
(Continued)

(58) Field of Classification Search
CPC .. F01N 5/02; F02B 37/04; F02B 39/10; F02B 41/10; F01K 23/10; F01K 23/065;
(Continued)

(56) References Cited

U.S. PATENT DOCUMENTS 5,794,431 A * 8/1998 Utamura ............... F01K 23/101
60/39.182
2001/0039797 A1 * 11/2001 Cheng ................... F01K 21/042
60/39.182

(Continued)

FOREIGN PATENT DOCUMENTS

| CN | 101415908 A | 4/2009 |
|----|-------------|--------|
| CN | 201874651 U | 6/2011 |

(Continued)

OTHER PUBLICATIONS

Decision of Refusal dated Sep. 11, 2014 issued in corresponding Japanese Application No. 2011-285466.
(Continued)

*Primary Examiner* — Mark Laurenzi
*Assistant Examiner* — Wesley Harris
(74) *Attorney, Agent, or Firm* — Birch, Stewart, Kolasch & Birch, LLP

(57) ABSTRACT

An object is to improve fuel consumption, drivability and exhaust gas purification by efficiently converting waste heat of the engine into electrical power and storing the electrical power in a dedicated electric storage so that the boost pressure from the electric air compressor can be flexibly outputted. The electric supercharging device includes a (Continued)

steam cycle device configured to expand the steam generated by waste heat of an engine to rotate an expander, a first generator connected to the expander and configured to generate an electrical power by torque of the expander, a dedicated battery which stores the electrical power generated by the first generator, and an electric supercharger configured to drive a compressor with a motor driven by the electrical power of the dedicated battery to generate compressed air.

5 Claims, 7 Drawing Sheets

(51) Int. Cl.
*F01K 13/02* (2006.01)
*F01K 25/10* (2006.01)
*F02B 37/00* (2006.01)
*F02B 37/04* (2006.01)
*F02B 37/16* (2006.01)
*F02B 37/18* (2006.01)
*F02B 39/10* (2006.01)
*F02D 23/00* (2006.01)
*F01K 23/06* (2006.01)
*F01K 25/08* (2006.01)
*F02G 5/02* (2006.01)
*F01K 23/10* (2006.01)
*F02B 41/10* (2006.01)

(52) U.S. Cl.
CPC .............. *F01K 25/08* (2013.01); *F01K 25/10* (2013.01); *F01N 5/025* (2013.01); *F02B 37/00* (2013.01); *F02B 37/04* (2013.01); *F02B 37/16* (2013.01); *F02B 37/18* (2013.01); *F02B 39/10* (2013.01); *F02B 41/10* (2013.01); *F02C 6/18* (2013.01); *F02D 23/00* (2013.01); *F02G 5/02* (2013.01); *Y02E 20/14* (2013.01); *Y02E 20/16* (2013.01); *Y02T 10/144* (2013.01); *Y02T 10/16* (2013.01); *Y02T 10/163* (2013.01); *Y02T 10/166* (2013.01)

(58) Field of Classification Search
CPC .......... F01K 25/08; F01K 13/02; F01K 25/10; Y02T 10/16; Y02T 10/166; Y02E 20/14; Y02E 20/16; F02C 6/18
USPC ............................................... 60/604; 67/604
See application file for complete search history.

(56) References Cited

U.S. PATENT DOCUMENTS

| | | | | |
|---|---|---|---|---|
| 2008/0173017 | A1* | 7/2008 | St. James | ................ F02B 33/40 60/608 |
| 2009/0118959 | A1* | 5/2009 | Kim | ..................... B60T 8/1708 701/71 |
| 2010/0077746 | A1 | 4/2010 | Gray, Jr. | |
| 2010/0275594 | A1* | 11/2010 | Katayama | ............. F01N 3/0205 60/597 |
| 2011/0174278 | A1 | 7/2011 | Watanabe et al. | |
| 2011/0209473 | A1* | 9/2011 | Fritz | ...................... F01K 23/065 60/605.2 |

FOREIGN PATENT DOCUMENTS

| | | | |
|---|---|---|---|
| GB | 1 539 166 A | 1/1979 | |
| JP | 58-65917 A | 4/1983 | |
| JP | 61-4814 A | 1/1986 | |
| JP | 6-88533 A | 3/1994 | |
| JP | 11-44232 A | 2/1999 | |
| JP | 2003-293782 A | 10/2003 | |
| JP | 2005-9315 A | 1/2005 | |
| JP | 2006-97591 A | 4/2006 | |
| JP | 2006-177171 A | 7/2006 | |
| JP | 2006-242154 A | 9/2006 | |
| JP | 2007-239566 A | 9/2007 | |
| JP | 2007-263026 A | 10/2007 | |
| JP | 2008-175126 A | 7/2008 | |
| JP | 2008-215075 A | 9/2008 | |
| JP | 2009-191686 A | 8/2009 | |
| JP | 2010-190145 A | 9/2010 | |
| JP | 2011-12625 A | 1/2011 | |
| JP | 2011-94536 A | 5/2011 | |
| JP | 2011-116152 A | 6/2011 | |
| JP | 2011-144772 A | 7/2011 | |
| JP | 2011-163307 A | 8/2011 | |
| JP | 2011-241744 A | 12/2011 | |
| JP | 2011241744 * | 12/2011 | ........... Y02T 10/142 |
| WO | WO 2008/135059 A1 | 11/2008 | |
| WO | WO 2011/058832 A1 | 5/2011 | |

OTHER PUBLICATIONS

International Preliminary Report on Patentability dated Jul. 10, 2014 for Application No. PCT/JP2012/077879.
International Search Report dated Jan. 29, 2013 for PCT/JP2012/077879.
Decision to Grant a Patent dated Jan. 15, 2015 issued in corresponding Japanese Application No. 2011-285466 with an English translation.
Japanese Office Action dated Feb. 28, 2014 issued in corresponding Japanese Application No. 2011-285466 with an English Translation.
Extended European Search Report, dated Aug. 4, 2015, for European Application No. 12861873.3.
Chinese Office Action dated Nov. 23, 2015 issued in the corresponding Chinese Application No. 201280061336.8 with an English Translation.
European Office Action, dated Apr. 13, 2018, for European Application No. 12861873.3.

* cited by examiner

ELECTRIC SUPERCHARGING DEVICE UTILIZING WASTE HEAT OF INTERNAL COMBUSTION ENGINE AND POWER SUPPLYING METHOD THEREOF

TECHNICAL FIELD

This invention relates to an electric supercharging device which drives an electric compressor using the electrical energy generated by utilizing waste heat of an internal combustion engine (hereinafter, referred to as "engine"), and a power supplying method thereof.

BACKGROUND

A turbocharger which drives a compressor by utilizing exhaust gas of an engine to supercharge intake air is generally used as a measure for attaining high output of the engine, reducing fuel consumption, and purifying the exhaust gas.

However, in the turbocharger that drives a turbine with the exhaust gas to drive a compressor directly coupled to the rotational shaft of the turbine, there is a problem of so-called turbo lag, taking time to complete sufficient supercharge by a compressor after a sufficient amount of exhaust gas of the engine has been discharged.

As a countermeasure thereof, used is a turbocharger accompanied by an electric motor, which drives a compressor by the electric motor.

As an example, JP2008-175126A (Patent Document 1) is disclosed. According to Patent Document 1, there is disclosed an electric motor axially coupled to the rotational shaft of a turbocharger and a technology of recovering energy by taking in a part or all of the exhaust gas having driven the turbocharger, converting the energy into electrical power to be stored, and driving the electric motor by the stored electrical power.

As the electric motor is axially coupled to the rotational shaft of the turbocharger, the rotation response of the turbine driven by the motor is insufficient due to the rotational inertia and the rotation load of the turbine.

Also, it is inefficient to drive the turbine again by the exhaust gas that has once driven the turbine.

Further, JP2010-190145A (Patent Document 2) discloses an electric compressor which supplies compressed air to an internal combustion engine by driving a compressor to rotate by an electric motor to compress air, a turbine generator which generates electrical power by driving a generator by a turbine driven by the exhaust gas from the internal combustion engine, an electric storage means for storing electricity generated in the turbine generator and supplying the electricity to the electric compressor, and a technology of arranging an exhaust gas purifying device on the exhaust gas flow path between the internal combustion engine and the turbine.

In this case, using a large amount of electrical power for the electric compressor reduces the power-supply voltage of the electric storage means, which negatively affects the operation of other devices and equipments sharing the same power supply with the electric storage means.

Also, frequent charge and discharge of the electrical power accelerates the deterioration of the battery of the electric storage means (in the case of a battery).

Further, when a large amount of electrical power is used for the electric compressor and the amount of electric charge of the electric storage means is decreased, the supercharging ability is reduced and the response of the engine is delayed, which makes the driver feel anxious.

CITATION LIST

Patent Literature

Patent Document 1: JP2008-175126A
Patent Document 2: JP2010-190145A

SUMMARY

Technical Problem

However, in the technology disclosed in Patent Document 1, the electric motor is axially coupled to the rotational shaft of the turbocharger. Thus, the rotational inertia and the rotational load of the turbine cause the rotation response of the turbine driven by the motor to be insufficient. Also, it is inefficient to drive the turbine again by the exhaust gas that has once driven the turbine.

Further, Patent Document 2 has disadvantages such as negative impact on the operation of other devices and equipments sharing the power supply with the electric storage means, and reduced supercharging ability due to consumption of the electric storage means, which delays the response of the engine and makes the driver feel anxious.

Solution to Problem

The present invention has been made in order to solve the above problems, and is to improve fuel consumption, drivability and exhaust gas purification by efficiently converting waste heat of the engine into electrical power and storing the electrical power in a dedicated electric storage so that the boost pressure from the electric air compressor can be flexibly outputted.

In order to solve such problems, the present invention comprises:
a steam cycle device configured to rotate a steam turbine with a steam generated by a heat of an exhaust gas discharged from an engine;
a first generating device configured to generate an electrical power by a torque of the steam turbine;
a first electric storage which stores the electrical power generated by the first generating device;
a motor configured to be driven by the electrical power of the first electric storage; and
an electric supercharger configured to drive a compressor with a motor driven by the electrical power of the first electric storage to generate a compressed air.

According to the present invention, it is possible to generate compressed air in accordance with the operation state of the existing equipments because the electrical power generated by the waste heat and stored is used, not the electrical power to be supplied for the existing electric components which use the engine as their power supply to operate existing equipments.

Also, increase in the exhaust pressure of the engine is suppressed because the electric supercharger is used and there is no turbine, which makes it possible to achieve fuel consumption equivalent to that of a naturally-aspirated engine.

It is possible to reduce the cost because the electric supercharger is used, which makes the ambient temperature relatively low, and thus high thermal resistance is not required for the motor inverter.

Also, preferably in the present invention, the electric supercharging device may further comprise:

an exhaust gas turbine disposed on an upstream side of the steam cycle device in an exhaust gas system and configured to be driven by the exhaust gas; and a second generating device connected to the exhaust gas turbine, wherein the electrical power generated by the second generating device is configured to be stored in the first electric storage.

With the above configuration, the exhaust gas turbine generating device is provided on the upstream side of the steam cycle device in the exhaust gas system. As a result, the temperature of the exhaust gas after driving the turbine is high enough, which makes it possible to improve the efficiency in recovering energy by generating electrical power with the exhaust gas turbine generating device and generating electrical power with the steam cycle device to utilize the motion energy and thermal energy of the exhaust gas.

Also, preferably in the present invention, the first generating device may include an exhaust gas turbine configured to be driven by the exhaust gas in addition to the steam turbine configured to be driven by the steam, the exhaust gas turbine and the steam turbine being arranged coaxially and in series.

The rotational shaft of the exhaust gas turbine and the rotational shaft of the steam turbine are arranged in series. Thus, it is possible to decrease the number of the converters and the generators by increasing the power generation amount of the generator in accordance with the increasing driving force of the generator, thereby reducing the installed number of the generators. As a result, it is possible to reduce the cost as well as to stabilize the quality by the allowance in the design layout for arrangement.

Also, preferably in the present invention, coupling between rotational shafts of the steam turbine and the exhaust gas turbine, or of the steam turbine and the first generating device may be coupled by a non-contact coupling.

Accordingly, coupling between rotational shafts of the steam turbine and the exhaust gas turbine, or of the steam turbine and the first generating device is coupled by the non-contact coupling. As a result, it is possible to seal the steam cycle device so that the steam in the steam cycle device does not leak out, which makes it easier to perform maintenance as well as to prevent decrease of the steam being a medium.

Also, preferably in the present invention, a turbocharger may be disposed on the upstream side of the steam cycle device in the exhaust gas system, and the compressed air discharged from the turbocharger or the electric supercharger may be configured to be supplied to an intake side of the compressor of one of the turbocharger or the electric supercharger from other one of the turbocharger or the electric supercharger, thereby realizing a two-stage supercharging.

With the above configuration, the turbocharger and the electric supercharger are arranged in series in the air supply system. As a result, it is possible to increase the supercharging pressure, as well as to suppress increase in the exhaust pressure of the engine even though the supercharging pressure becomes high, thereby improving the output of the engine and the fuel consumption.

Also, preferably in the present invention, the supercharging device may further comprise an exhaust gas purifying device disposed between the steam cycle device and the turbocharger; and a wastegate valve disposed on an upstream side of the turbocharger in an exhaust gas system to adjust an amount of the exhaust gas introduced into the turbocharger, wherein the exhaust gas introduced into the turbocharger is configured to be introduced into the steam cycle device via the exhaust gas purifying device, and wherein the exhaust gas from the wastegate valve is configured to be introduced to the steam cycle device via a bypass line bypassing the exhaust gas turbocharger.

With the above configuration, the effect of heating the catalyst accommodated in the exhaust gas purifying device is maintained by disposing the exhaust gas purifying device on an upstream side of the steam cycle device in the exhaust gas system. Also, increase in driving resistance of the turbine is prevented by introducing the exhaust gas that has bypassed the wastegate into the exhaust gas pipe connecting the exhaust gas purifying device and the steam cycle device.

Also, preferably in the present invention, the supercharging device may further comprise a second electric storage for operating a device whose drive source is the engine, wherein the electrical power is interchanged between one of the electric storages and other one of the electric storages when one of the first electric storage or the second electric storage has an allowance in a required amount of electric charge required for operation by said one of the electric storages and the other one of the electric storages has an insufficient amount of electric charge to meet the required amount of electric charge.

Also, preferably in the present invention, a power supplying method is for an electric supercharging device utilizing a waste heat of an internal combustion engine, the electric supercharging device comprising: a steam cycle device configured to rotate a steam turbine with a steam generated by a heat of an exhaust gas discharged from an engine; a first generating device connected to the steam turbine and configured to generate an electrical power by a torque of the steam turbine; a first electric storage which stores the electrical power generated by the first generating device; a second electric storage for device operation for operating a device whose drive source is the engine; and an electric supercharger configured to drive a compressor with a motor driven by the electrical power of the first electric storage to generate a compressed air. The method comprises the steps of:

checking a state of electric charge of each of the electric storages;

determining whether the checked state of electric charge satisfies a required amount of electric charge for usage state of each of the electric storages; and interchanging the electrical power between one of the electric storages and other one of the electric storages when one of the electric storages has an allowance in the required amount of electric charge and the other one of the electric storages has an insufficient amount of electric charge.

With the above configuration, when the amount of electric charge of each of the electric storage device for operating the devices and the other electric storage is checked and determined to be short, the electrical power is interchanged between each other to secure the performance of the function. Also, when the amount of electric charge is insufficient, the supercharging effect decreases but does not become zero, which makes it possible to obtain the effect of the amount of minimum requirement without the device being stopped.

Advantageous Effects

It is possible to generate compressed air in accordance with the operation state of the vehicle because the electrical power generated by the waste heat and stored is used, not the electrical power to be supplied for the exiting electric components of the vehicle.

It is possible to reduce the cost because the electric supercharger is used, which makes the ambient temperature relatively low, and thus high thermal resistance is not required for the motor inverter.

DETAILED DESCRIPTION

Figure 1:
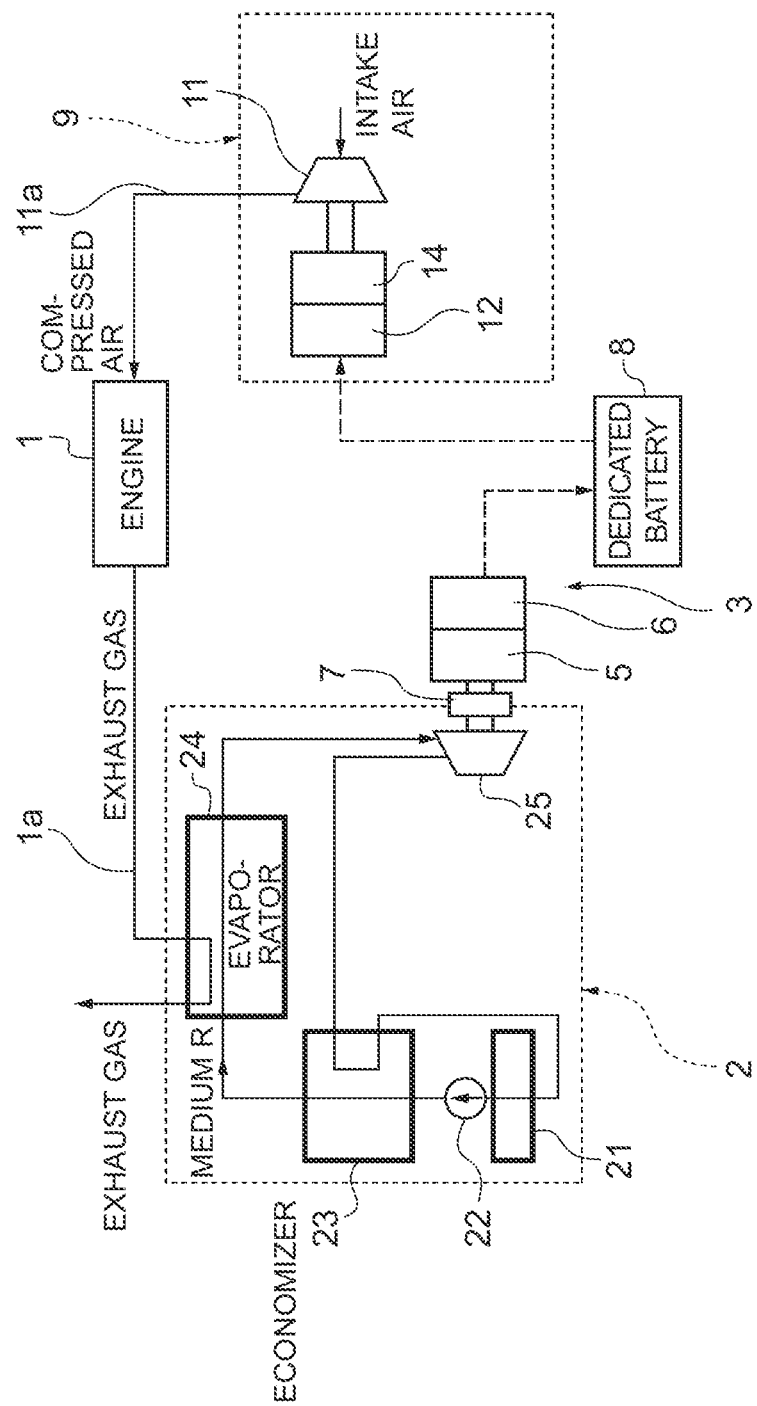
FIG. 1 is a schematic diagram for explaining the configuration according to the first embodiment of the present invention.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

A schematic diagram of the entire configuration of an electric supercharging device utilizing the waste heat of the engine according to the first present invention is shown, where 1 is the engine.

The exhaust gas discharged from the engine 1 is introduced into a steam cycle device 2 which converts heat of the exhaust gas into rotation energy via an exhaust gas pipe 1a. The rotation energy of the steam cycle device 2 drives the first generator 5 via a magnet coupling 7 being a non-contact coupling to generate alternate current. The alternate current is converted into direct current by the first converter 6 provided adjacent to the first generator 5 (the first generator 5 and the first converter 6 collectively form the first generating device 3), and then the direct current is stored in the battery 8 being the first electric storage.

9 is the electric supercharger which drives the first compressor 11 connected to a motor 14 powered by the electrical power stored in the battery 8 to turn the intake air into compressed air, which is introduced into the engine 1.

The steam cycle device 2 includes an evaporator 24 which changes a medium R from liquid to steam by heat of the exhaust gas and an expander 25 being a steam turbine which expands and converts the steam having been vaporized in the evaporator 24 into rotation energy. The steam discharged from the expander 25 is introduced into an economizer 23.

Inside the economizer 23, the medium R, which is to be changed from steam to liquid in the following condenser 21, is superheated in advance by heat of the exhaust gas.

After passing through the economizer 23, the medium R is cooled by the condenser 21 and changed from steam to liquid.

The medium R having been condensed in the condenser 21 is transmitted to the economizer 23 by the water supply pump 22 to be preheated by the exhaust gas as described above. The preheated medium R is introduced again into the evaporator 24 and changed from liquid to steam.

Although an alternative chlorofluorocarbon is used as the medium R in the present embodiment, the same effect can be attained with other media that have equivalent function.

Also, although the economizer 23 is used in the present embodiment, it can be omitted when the exhaust gas has high temperature and the change from liquid to steam is sufficiently performed by heat of the exhaust gas in the evaporator 24.

Moreover, when the exhaust gas has low temperature and the change from liquid to steam is not sufficiently performed by heat of the exhaust gas in the evaporator 24, another device may be additionally provided for superheating.

The first generating device 3 includes the first generator 5 being the first alternate current generator and the first converter 6, which converts the alternate current generated by the first generator 5 into direct current.

The first generator 5 is configured such that the rotation of the expander 25 is transmitted to the first generator 5 via the magnet coupling 7, which is a non-contact coupling disposed coaxially with the expander 25.

The magnet coupling 7 is used as a non-contact rotation transmitting device because seal is required to prevent the medium R (in this case, in the form of steam) from leaking out of the expander 25.

The electric supercharger 9 includes an inverter 12 which converts the electrical power from the dedicated battery 8 from direct current to alternate current, a motor 14 being driven to rotate by the electrical power converted into direct current by the inverter 12, and the first compressor 11 coupled coaxially to the motor 14, the compressor 11 being configured to compress the intake air and discharge the intake air as compressed air to the engine via the air supply pipe 11a.

Herein, the dedicated battery 8 is provided because there is possibility that sharing the other electric storage (battery) for operating equipments (devices) which use the engine 1 as the power supply may have negative impact on the operation of the equipments (devices).

Figure 6:
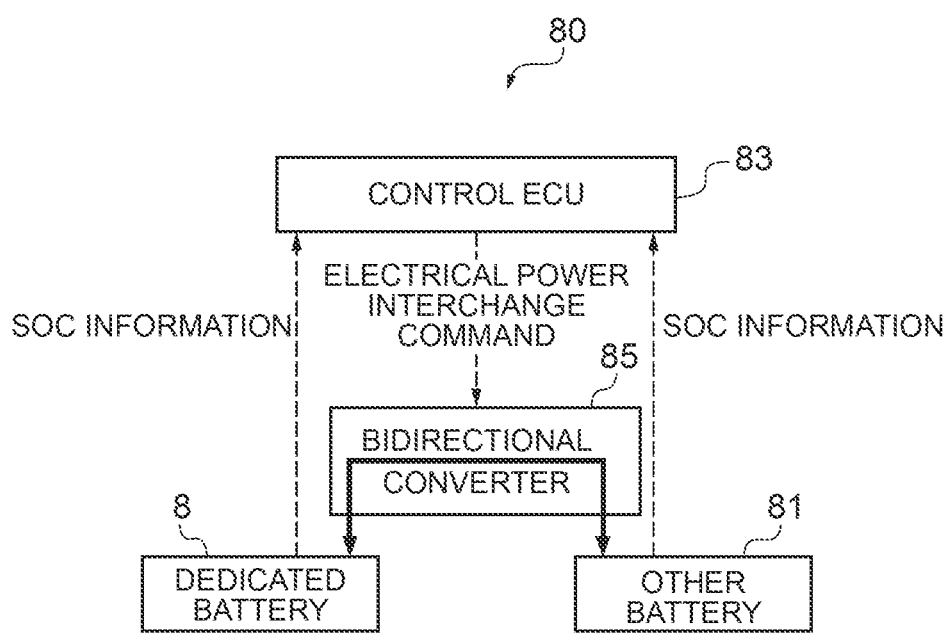
FIG. 6 is a conceptual diagram of the power management system according to the present invention.

Also, in the present embodiment, a power management system 80 is provided as shown in FIG. 6. In the power management system 80, the electrical power is interchanged with the other battery 81 being the second electric storage for actuating (operating) existing equipments (devices) using the engine 1 as the power supply when both of the batteries have allowance in the amount of electric storage.

The power management system 80 includes: a control ECU 83 for controlling the dedicated battery 8, the other battery 81, and the interchange between the batteries while monitoring SOC (the State of Charge) of each of the batteries 8, 11; and a bidirectional converter 85 for interchanging electrical power (electrical current) between the batteries 8, 81 based on the electrical power interchange command of the controller ECU 83.

The power management system 80 is to interchange electrical power from the dedicated battery 8 to the other battery 81 when the amount of electric charge is not less than the so-called required amount of electric charge, that is, the amount of electrical power for driving the motor 14 by the dedicated battery 8 in order to obtain necessary compressed air in the first compressor 11, and the amount of electric charge of the other battery 81 is less than the required amount of electric charge for actuating (operating) the above existing equipments (devices).

On the other hand, the power management system 80 is to interchange the electrical power from the other battery 81 to the dedicated battery 8 when the dedicated battery 8 is short of the required amount of electric charge and the other battery 81 has the amount not less than the required amount of electric charge for actuating (operating) the equipments (devices).

Figure 7:
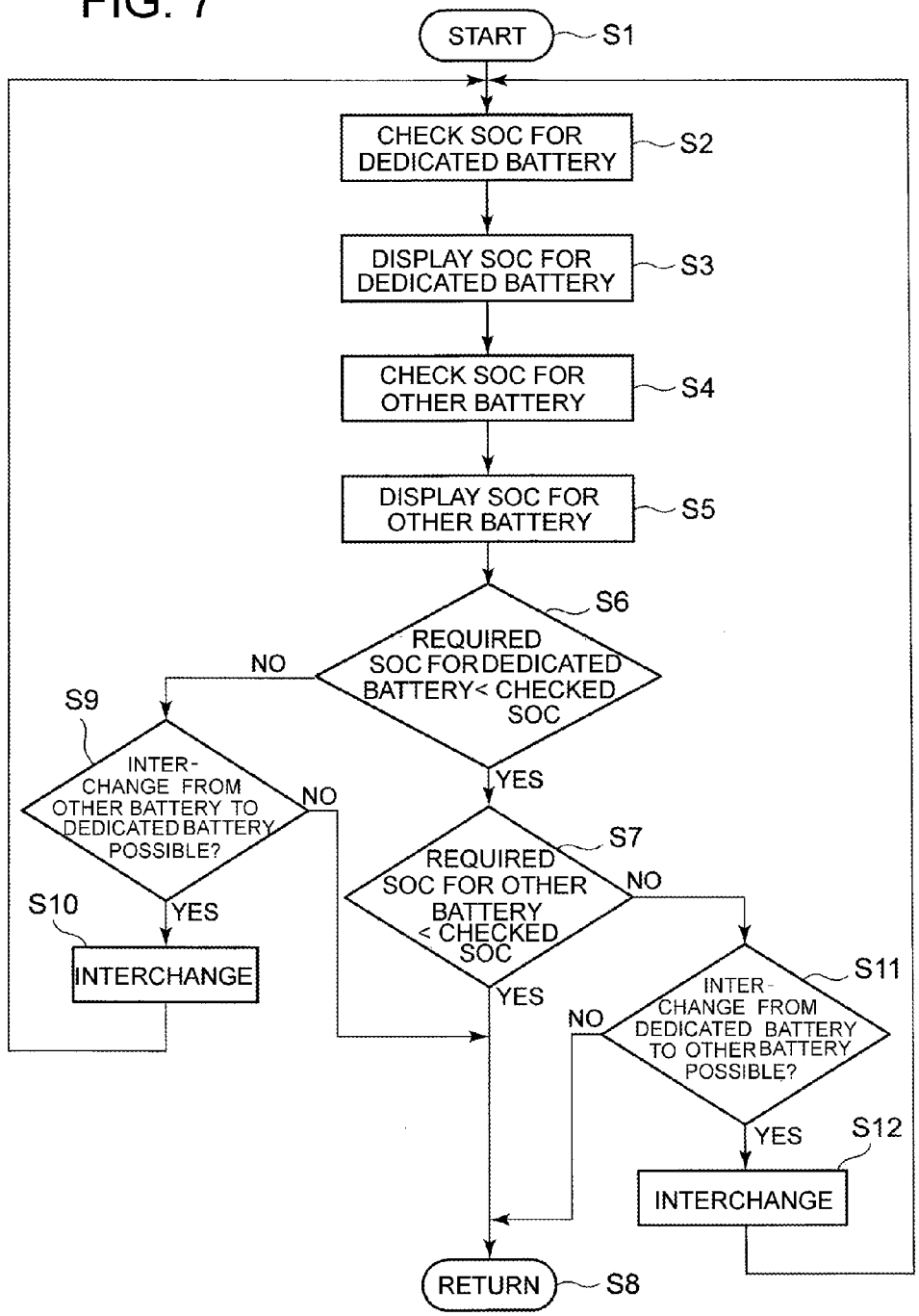
FIG. 7 is a flow chart of control of the power management system according to the present invention.

In reference to FIG. 7, the control flow will now be described based on the power management system 80.

The process starts in step S1, and then SOC of the dedicated battery 8 is checked by the control ECU 83 in step S2. The result thereof is displayed at the driver's seat by the control ECU 83 in step S3.

SOC of the other battery 81 is checked by the control ECU 83 in step S4. The result thereof is displayed at the driver's seat by the control ECU 83 in step S5.

In step S6, the control ECU 83 determines whether the amount of electric charge of the dedicated battery 8 detected in step S2 is not less than the so-called required amount of electric charge, that is, the amount of electrical power for driving the motor 14 in order to obtain necessary compressed air in the first compressor 11. When the amount is not less than the required amount of electric charge, YES is selected, proceeding to step S7. The control ECU 83 determines whether the amount of electric charge of the other battery 81 detected in step S4 is not less than the required amount of electric charge for actuating (operating) the equipments (devices) in S7. When the amount is not less than the required amount of electric charge, the process advances to S8 and then returns.

In this case, the electrical power is not interchanged because both of the dedicated battery 8 and the other battery 81 have the required amount of electric charge.

When NO is selected in step 6, that is, when the dedicated battery 8 has the amount not greater than the required amount of electric charge, the process proceeds to step S9. The control ECU 83 determines whether the amount of electric charge for actuating (operating) equipments (devices) of other batteries 81 detected in step S4 is not less than the required amount of electric charge in S9. When the amount is not less than the required amount of electric charge, the process proceeds to step S10, in which the control ECU 83 transmits an electrical power interchange command for interchanging from the other battery 81 to the dedicated battery 8 to the bidirectional converter 85. The bidirectional converter 85 then executes the command. When the command is executed in step S10, change occurs in SOC of each of the dedicated battery 8 and the other battery 81. Thus, the process returns to step S2 to monitor whether the dedicated battery 8 has the required amount of electrical charge, and it is also monitors in step S4 whether the battery 81 have the amount greater than the required amount of electric charge. When NO is selected in step S9, that is, when interchange from the other battery 81 to the dedicated battery 8 is not possible (including the case there is the required amount of electric charge but no allowance), the process proceeds to step S8 and no interchange is performed.

When NO is selected in step S7, that is, when the other battery 81 has the amount not greater than the required amount of electric charge, the process proceeds to step S11. The control ECU 83 determines whether the amount of electric charge of the dedicated battery 8 for driving the motor 14 detected in step S2 is not less than the required amount of electric charge in step S11. When the amount is not less than the required amount of electric charge, the process advances to step S12, in which the control ECU 83 transmits an electrical power interchange command for interchange from the dedicated battery 8 to the other battery 81 to the bidirectional converter 85, which then executes the command. When the command is executed in step S12, change occurs in SOC of each of the dedicated battery 8 and the other battery 81. Thus, the process returns to step S2, in which it is monitored whether the dedicated battery 8 has the amount not greater than the required amount of electric charge. Also, it is constantly monitored whether the other battery 81 has the required amount of electric charge. When NO is selected in step S11, that is, when interchange from the other battery 81 to the dedicated battery 8 is not possible (including the case there is the required amount of electric charge but no allowance), the process proceeds to step S8 and no interchange is performed.

With the above configuration, the electrical power generated by waste heat of the engine and stored is used, which makes it possible to generate compressed air in accordance with the operation state of the vehicle without using the electrical power to be supplied to existing electric components for operating devices that use the engine as the power supply.

Also, as the electric supercharger is used, the electric supercharger does not include turbine and thus increase in the exhaust pressure of the engine is suppressed, which makes it possible to achieve fuel consumption equivalent to that of a naturally-aspirated engine.

As the electric supercharger is used, it is possible to reduce the cost because the ambient temperature is relatively low and thus high thermal resistance is not required for the motor inverter.

Further, as the power management system 80 is provided, the electrical power is interchanged between each other to secure the performance of the function when the amount of electric charge is checked and determined to have become short in the dedicated electric storage device for operating the devices and the other electric storage. Also, when the amount of electric charge is insufficient, the supercharging effect decreases but it does not become zero, which makes it possible to obtain the effect of the amount of minimum requirement without the device being stopped.

Second Embodiment

Figure 2:
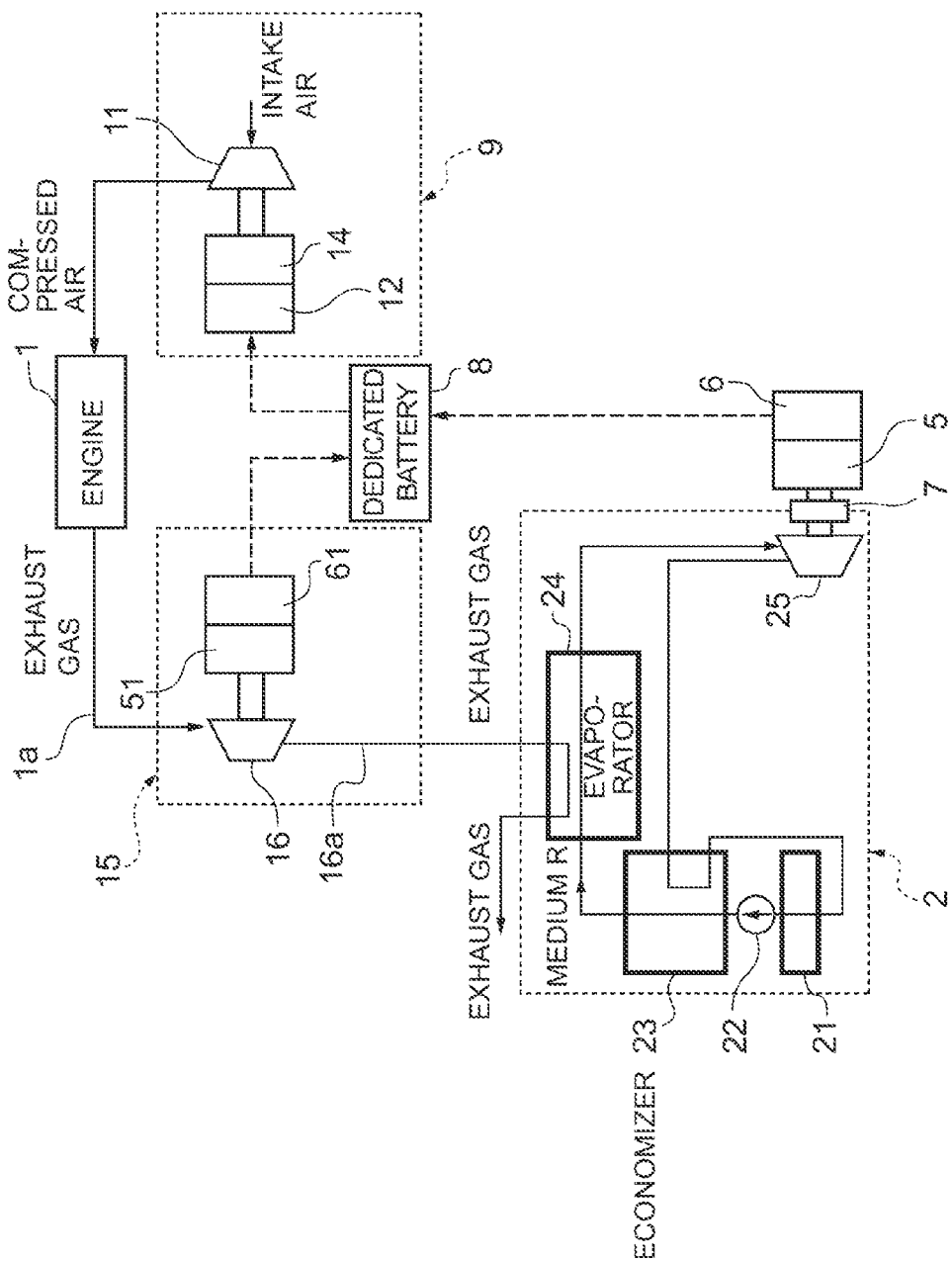
FIG. 2 is a schematic diagram for explaining the configuration according to the second embodiment of the present invention.

Compared to the first embodiment, the present embodiment, shown in FIG. 2, includes an exhaust gas turbine generator 15 disposed between the steam cycle device 2 and the engine 1. Accordingly, the same feature is associated with same reference number to omit the description.

The exhaust gas discharged from the engine 1 is introduced into the exhaust gas turbine generator 15 being the second generating device via an exhaust gas pipe 1a. The exhaust gas that has driven the exhaust gas turbine 16 of the exhaust gas turbine generator 15 is introduced into the steam cycle device 2. The steam cycle device 2 drives the expander 25 being a steam turbine to rotate by the steam generated from the liquid medium by heat of the exhaust gas, driving the first generator 5 to generate electrical power. The generated electrical current is converted into direct current from alternate current by the first converter 6 and then stored in the battery 8, which is the dedicated electric storage.

Herein, the expander 25 and the first generator 5 are coaxially coupled by the magnet coupling 7.

The electric current of the battery 8 actuates the electric supercharger 9, which pressurizes the intake air to obtain compressed air. The compressed air is introduced into a combustion chamber (not shown) of the engine via the air supply pipe 11a.

The exhaust gas turbine generator 15 includes the exhaust gas turbine 16, a second generator 51 coaxially coupled to the exhaust gas turbine 16, and a second converter 61 for converting the electrical current generated by the second generator 51 from alternate current to direct current.

The electrical current generated by the second generator 51 is stored in the dedicated battery 8.

With this configuration, the exhaust gas turbine 16 is driven in the exhaust gas turbine generator 15 to generate electrical power, and the high temperature of the exhaust gas that has driven the exhaust gas turbine 16 is maintained. Thus, the expander 25 being a steam turbine is driven to rotate by the steam generated by heat of the exhaust gas utilizing heat of the exhaust gas in the steam cycle 2.

Accordingly, the energy is recovered in two-stage of the exhaust gas turbine generator 15 and the steam cycle device 2. As a result, there is high efficiency in recovering energy, which makes it possible to increase the amount of power generation.

Third Embodiment

Figure 3:
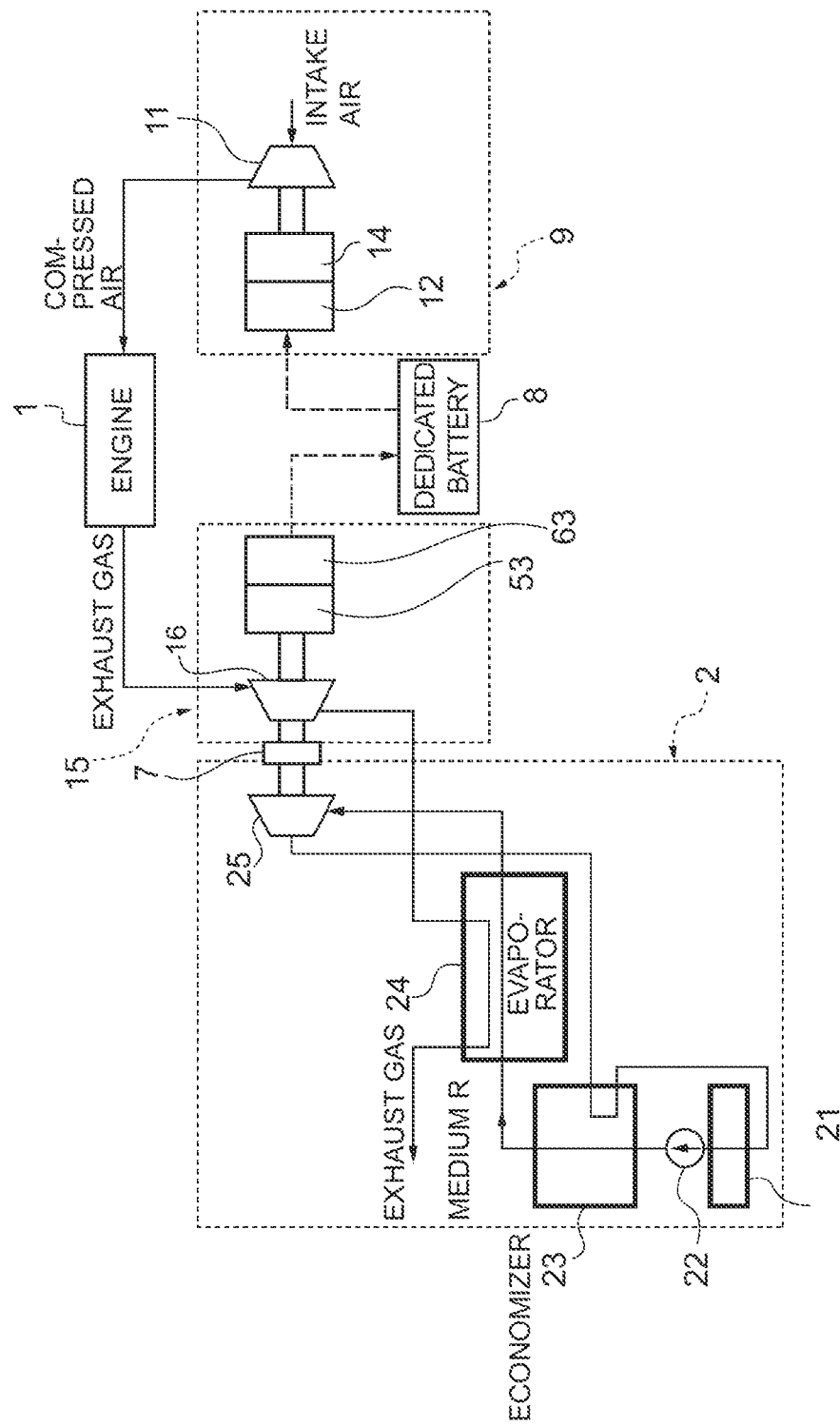
FIG. 3 is a schematic diagram for explaining the configuration according to the third embodiment of the present invention.

Compared to the first embodiment, in the present embodiment, shown in FIG. 3, the rotational shaft of the expander 25 of the steam cycle device 2 and the rotational shaft of the exhaust gas turbine generator 15 of the second embodiment are coaxially coupled by the magnet coupling 7.

The exhaust gas discharged from the engine 1 is introduced into the exhaust gas turbine generator 15 via the exhaust gas pipe 1a. The exhaust gas having driven the exhaust gas turbine 16 of the exhaust gas turbine generator 15 is introduced into the steam cycle device 2. The steam cycle device 2 changes liquid medium into steam, and drives the expander 25 to rotate with the steam.

The exhaust gas turbine generator 15 includes the exhaust gas turbine 16 that is driven to rotate by the exhaust gas from the engine 1, a third generator 53 disposed on the other end side of the rotation of the exhaust gas turbine 16, and a third converter 63 for converting the electric current generated by the third generator 53 from alternate current to direct current.

Also, the rotational shaft of the expander 25 and the rotational shaft of the exhaust gas turbine 16 are coaxially arranged and coupled by the magnet coupling 7, so that the expander 25 and the exhaust gas turbine 16 are arranged in series.

Further, the electrical current generated by the third generator 53 is charged in the dedicated battery 8 being an electric storage. The electric current of the battery 8 actuates the electric supercharger 9, which pressurizes the intake air to obtain compressed air. The compressed air is introduced into a combustion chamber (not shown) of the engine 1 via the air supply pipe 11a.

With this configuration, the expander 25 and the exhaust gas turbine 16 are arranged in series. As a result, the rotation torque is increased and thus the capacity of the third generator 53 can be increased, which makes it possible to improve the power generation efficiency.

Further, it is possible to decrease the number of both the third generators 53 and the converters 63. As a result, it is possible to reduce the cost as well as to stabilize the quality by the allowance in the design layout for arrangement.

Fourth Embodiment

Figure 4:
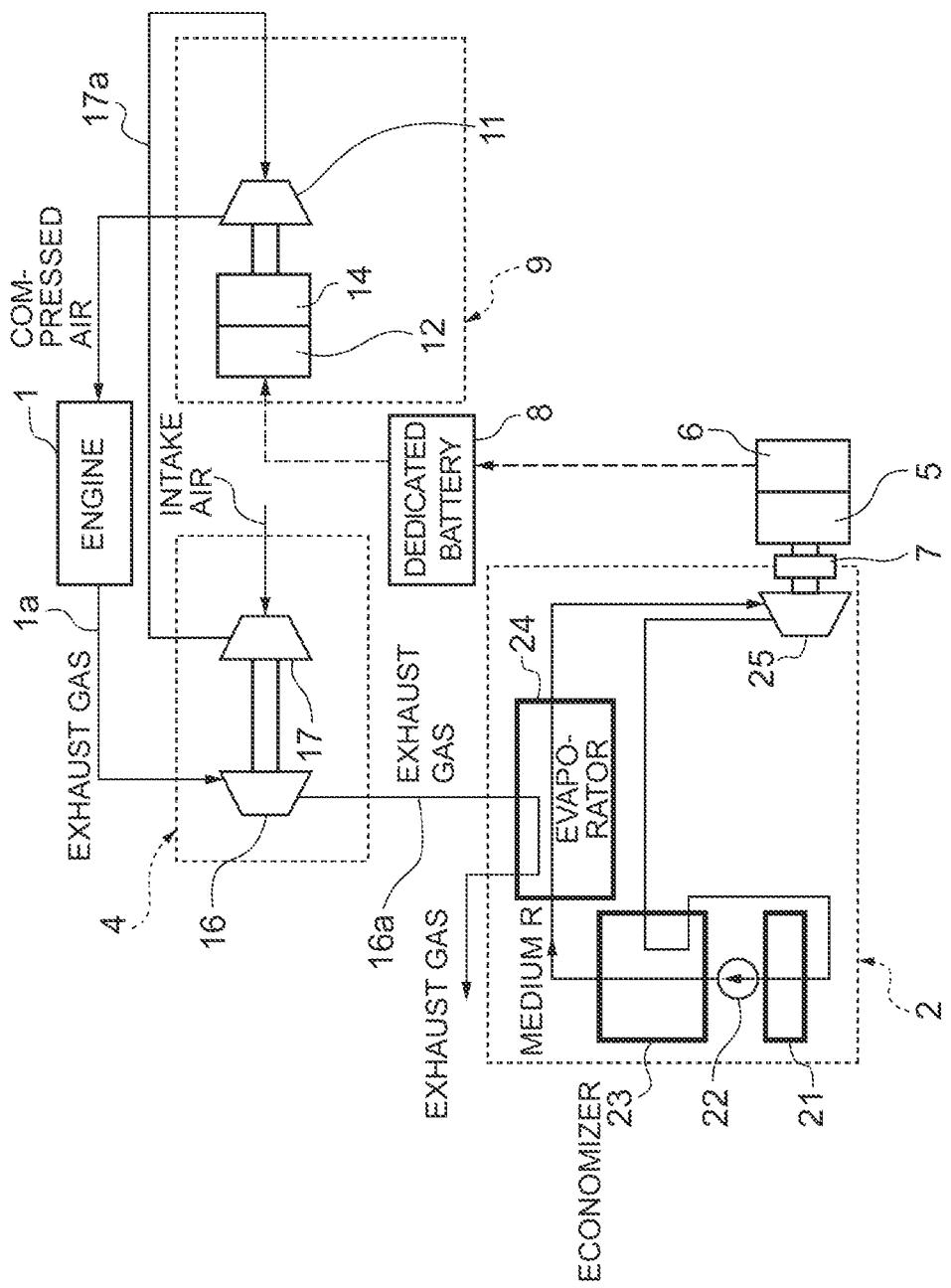
FIG. 4 is a schematic diagram for explaining the configuration according to the fourth embodiment of the present invention.

Compared to the first embodiment, the present embodiment, shown in FIG. 4, includes a turbocharger 4 between the steam cycle device 2 and the engine 1 to realize two-stage supercharging. Accordingly, the same feature is associated with the same reference number to omit the description.

The exhaust gas discharged from the engine 1 is introduced into the turbocharger 4 via the exhaust gas pipe 1a to drive the exhaust gas turbine 16.

The exhaust gas having driven the exhaust gas turbine 16 is introduced into the steam cycle device 2. The steam cycle device 2 changes the liquid medium into steam, and drives the expander 25 to rotate with the steam, thereby driving the first generator 5 to generate electrical power. The generated electrical current is converted from alternate current to direct current by the first converter 6 and stored in the battery 8 being a dedicated electric storage.

Also, the expander 25 and the first generator 5 are coaxially coupled by the magnet coupling 7.

The electric current of the battery 8 actuates the electric supercharger 9, which pressurizes the intake air to obtain compressed air. The compressed air is introduced into a combustion chamber (not shown) of the engine via the air supply pipe 11a.

The turbocharger 4 includes the exhaust gas turbine 16 driven to rotate by the exhaust gas, a second compressor 17 attached to the rotational shaft of the exhaust gas turbine 16 and configured to pressurized intake air, and a pressure pipe 17a for introducing the compressed air generated by the second compressor 17 to the upstream side of the first compressor 11 of the electric supercharger 9.

Accordingly, in the present embodiment, compressed air of the first stage is generated in the turbocharger 4, and the compressed air is introduced into the intake side, which is the upstream side of the first compressor 11 of the electric supercharger 9.

Then, the compressed air is further pressurized by the first compressor 11 of the electric supercharger 9. The first-stage compressed air is generated in the turbocharger 4, and then the compressed air is introduced into the intake side, which is the upstream side of the compressor 11 of the supercharger 9, thereby realizing two-stage supercharging.

On the other hand, the exhaust gas having driven the turbocharger 4 is configured to drive the first generator 5 by converting heat energy to rotation energy in the steam cycle device 2, thereby charging the battery 8 which serves as the power supply of the motor 14 for driving the first compressor 11.

With the above configuration, the turbocharger and the electric supercharger are arranged in series in the air supply system. As a result, it is possible to increase the supercharging pressure and to suppress increase in the exhaust pressure of the engine even though the supercharging pressure is increased, which makes it possible to improve the output of the engine and fuel consumption.

Fifth Embodiment

Figure 5:
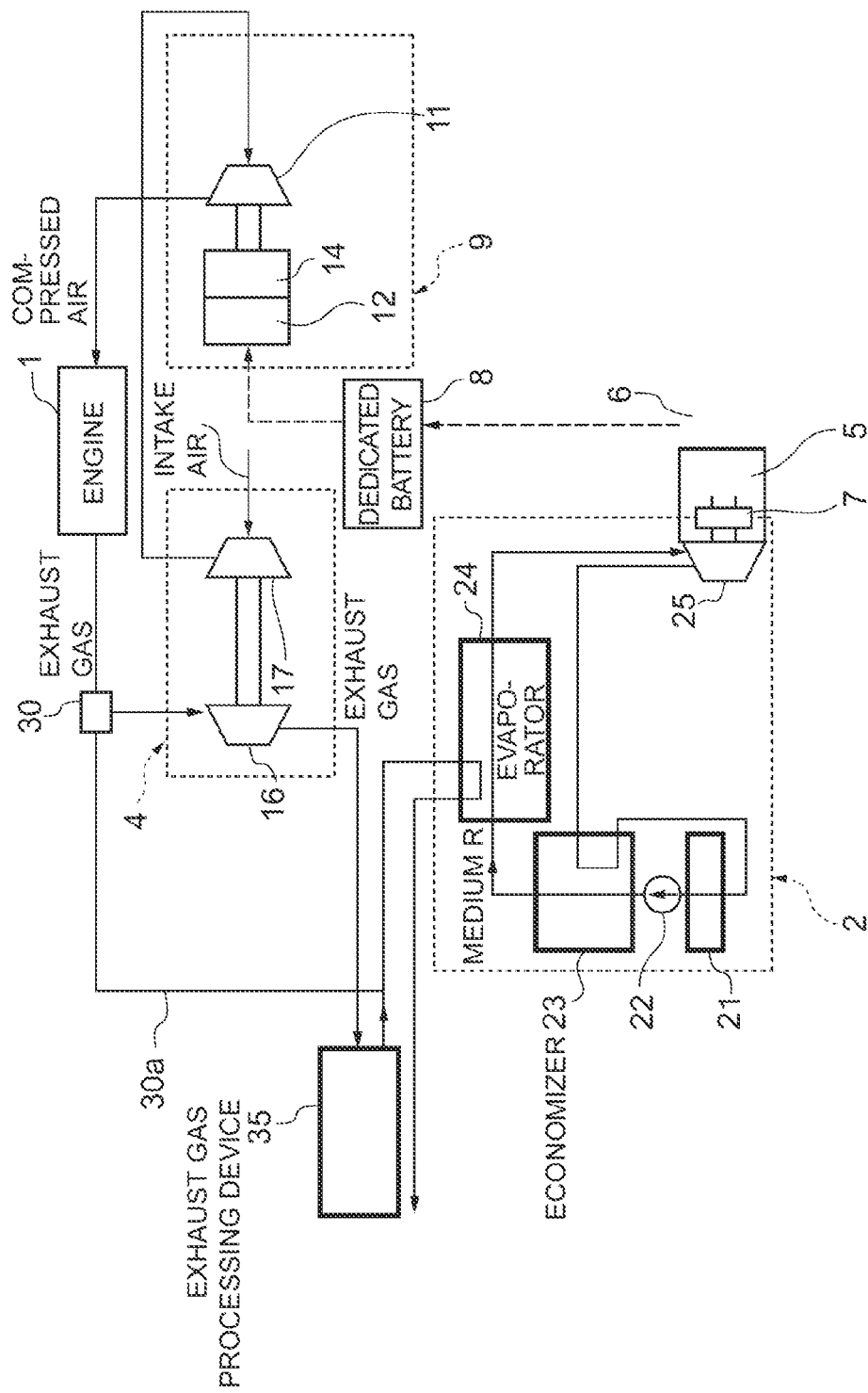
FIG. 5 is a schematic diagram for explaining the configuration according to the fifth embodiment of the present invention.

Compared to the first embodiment, the present embodiment, shown in FIG. 5, includes a turbocharger 4 between the steam cycle device 2 and the engine 1, which realizes two-stage supercharging. The present embodiment also includes a wastegate valve 30 for the turbocharger 4 and an exhaust gas processing device 35 on the downstream side of the turbocharger 4.

Accordingly, the same feature is associated with the same reference number to omit the description.

The exhaust gas discharged from the engine 1 is introduced into the wastegate valve positioned on the upstream side of the turbocharger 4 in the exhaust gas system via the exhaust gas pipe 1a. The wastegate valve controls the supercharging pressure of the turbocharger 4.

The exhaust gas introduced into the wastegate valve 30 is introduced into the exhaust gas flowing to the exhaust gas turbine 16 side by supercharging pressure of the turbocharger 4, and the exhaust gas whose flow volume has been adjusted is introduced into the steam cycle device 2 via the bypass pipe 30a.

The exhaust gas discharged from the exhaust gas turbine 16 passes through the inside of the exhaust gas processing device 35 and is introduced into the steam cycle device 2.

The steam cycle device 2 changes the liquid being a medium into steam, drives the expander 25 to rotate with the steam, and then drives the first generator 5 to generate electrical power. The generated electrical current is converted from alternate current to direct current by the first convertor 6 and then stored in the battery 8, which is a dedicated electric storage.

Herein, the expander 25 and the first generator 5 are coaxially coupled by the magnet coupling 7.

The electric current of the battery 8 actuates the electric supercharger 9, which pressurizes the intake air to obtain compressed air. The compressed air is introduced into a combustion chamber (not shown) of the engine 1 via the air supply pipe 11a.

The turbocharger 4 includes the exhaust gas turbine 16 driven to rotate by the exhaust gas, a second compressor 17 attached to the rotational shaft of the exhaust gas turbine 16 and configured to pressurize intake air, and a pressure pipe 17a for introducing the compressed air generated by the second compressor 17 to the upstream side of the first compressor 11 of the electric supercharger 9.

Accordingly, in the present embodiment, compressed air of the first stage is generated in the turbocharger 4, and the compressed air is introduced into the intake side, which is the upstream side of the compressor 11 of the electric supercharger 9, thereby performing two-stage supercharging.

Also, as the exhaust gas discharged from the exhaust gas turbine 16 maintains high temperature, the exhaust gas is introduced into the exhaust gas processing device 35 to supercharge the catalyst (oxidation catalyst, SCR catalyst and the like) disposed inside the exhaust gas processing device 35 so as to promote the reaction.

The exhaust gas discharged from the exhaust gas processing device 35 is merged with the exhaust gas that has flowed through the bypass pipe 30a and is introduced into the steam cycle device 2.

The effect of heating the catalyst accommodated in the exhaust gas processing device is maintained by arranging the exhaust gas purifying device on the upstream side of the steam cycle device in the exhaust gas system. Also, there is the effect of maintaining high temperature of the exhaust gas temperature introduced into the steam cycle device by introducing the exhaust gas that has bypassed the waste gate to the exhaust gas pipe connecting the exhaust gas purifying device and the steam cycle device. Further, the thermal energy is recovered in the steam cycle device, which makes it possible to improve the efficiency in recovering the exhaust gas energy.

INDUSTRIAL APPLICABILITY

It is possible to provide a supercharger driving device which recovers waste heat of the internal combustion engine (hereinafter, referred to as "engine") and drives an electric compressor.

The invention claimed is:

1. An electric supercharging device utilizing a waste heat of an internal combustion engine, comprising:
   a steam cycle device including an evaporator that generates steam by a heat of an exhaust gas discharged from an engine, the steam cycle device further including a steam turbine;
   a first generating device configured to generate an electrical power by a torque of the steam turbine;
   a first electric storage which stores the electrical power generated by the first generating device;
   a motor configured to be driven by the electrical power of the first electric storage;
   an electric supercharger configured to drive a first compressor with the motor driven by the electrical power of the first electric storage to generate a compressed air;
   an exhaust gas turbine disposed on an upstream side of the steam cycle device in an exhaust gas system and configured to be driven by the exhaust gas; and
   a second generating device connected to the exhaust gas turbine,
   wherein the electrical power generated by the second generating device is configured to be stored in the first electric storage.

2. The electric supercharging device utilizing a waste heat of an internal combustion engine according to claim 1, wherein
   the first generating device includes an exhaust gas turbine configured to be driven by the exhaust gas in addition to the steam turbine configured to be driven by the steam, the exhaust gas turbine and the steam turbine being arranged coaxially and in series.

3. The electric supercharging device utilizing a waste heat of an internal combustion engine according claim 1, wherein
   rotational shafts of the steam turbine and the exhaust gas turbine, or rotational shafts of the steam turbine and the first generating device are coupled by a non-contact coupling.

4. The electric supercharging device utilizing a waste heat of an internal combustion engine according to claim 1,
   wherein a rotating shaft of the exhaust gas turbine is disconnected from a rotating shaft of the first compressor.

5. A power supplying method for an electric supercharging device utilizing a waste heat of an internal combustion engine, the electric supercharging device comprising: a steam cycle device configured to rotate a steam turbine with a steam generated by a heat of an exhaust gas discharged from an engine; a first generating device connected to the steam turbine and configured to generate an electrical power by a torque of the steam turbine; a first electric storage which stores the electrical power generated by the first generating device; a second electric storage for device operation for operating a device whose drive source is the engine; an electric supercharger configured to drive a first compressor with a motor driven by the electrical power of the first electric storage to generate a compressed air; an exhaust gas turbine disposed on an upstream side of the steam cycle device in an exhaust gas system and configured to be driven by the exhaust gas; and a second generating device connected to the exhaust gas turbine, the second electric storage storing the electrical power for operating a device other than the supercharger, the device being driven by the engine, the electrical power generated by the second generating device being configured to be stored in the first electric storage, and the method utilizing a waste heat of an internal combustion engine comprising the steps of:

checking a state of electric charge of each of the first and second electric storages;

determining whether the checked state of electric charge satisfies a required amount of electric charge for usage state of each of the first and second electric storages; and interchanging the electrical power between one of the first or second electric storages and other one of the first or second electric storages when one of the first or second electric storages has an allowance in the required amount of electric charge and the other one of the first or second electric storages has an insufficient amount of electric charge.

* * * * *